United States Patent
Skarsgard et al.

(10) Patent No.: US 12,514,705 B2
(45) Date of Patent: Jan. 6, 2026

(54) HEART VALVE REPAIR APPARATUS

(71) Applicant: VESALIUS CARDIOVASCULAR INC., Vancouver (CA)

(72) Inventors: Peter Lloyd Skarsgard, Vancouver (CA); Ryan Harrington, Vancouver (CA); Michele Touchette, Vancouver (CA)

(73) Assignee: VESALIUS CARDIOVASCULAR INC., Vancouver (CA)

( * ) Notice: Subject to any disclaimer, the term of this patent is extended or adjusted under 35 U.S.C. 154(b) by 0 days.

(21) Appl. No.: 18/676,748

(22) Filed: May 29, 2024

(65) Prior Publication Data
US 2025/0366988 A1    Dec. 4, 2025

(51) Int. Cl.
*A61F 2/24*    (2006.01)

(52) U.S. Cl.
CPC .... *A61F 2/2445* (2013.01); *A61F 2220/0025* (2013.01)

(58) Field of Classification Search
CPC ........ A61F 2/24; A61F 2/2412; A61F 2/2442; A61F 2/2445; A61F 2/2457
See application file for complete search history.

(56) References Cited

U.S. PATENT DOCUMENTS

| | | | |
|---|---|---|---|
| 1,678,986 A * | 7/1928 | Lawson | B23K 11/062 |
| | | | 219/104 |
| 6,174,332 B1 * | 1/2001 | Loch | A61F 2/2445 |
| | | | 623/2.37 |
| 7,027,851 B2 | 4/2006 | Mejia | |
| 8,652,202 B2 | 2/2014 | Alon et al. | |
| 9,044,221 B2 | 6/2015 | Zentgraf et al. | |
| 9,295,553 B2 | 3/2016 | Padala et al. | |
| 9,662,208 B2 * | 5/2017 | Padala | A61F 2/2457 |
| 9,907,547 B2 * | 3/2018 | Gilmore | A61B 17/00234 |
| 10,039,531 B2 | 8/2018 | Yoganathan et al. | |
| 10,080,659 B1 * | 9/2018 | Zentgraf | A61F 2/2412 |
| 10,195,030 B2 * | 2/2019 | Gross | A61F 2/2454 |
| 10,206,776 B2 | 2/2019 | Alon | |
| 10,238,495 B2 | 3/2019 | Marsot et al. | |
| 10,245,143 B2 * | 4/2019 | Gross | A61F 2/2439 |

(Continued)

FOREIGN PATENT DOCUMENTS

| | | |
|---|---|---|
| WO | 2003037227 A2 | 5/2003 |
| WO | 2013037805 A1 | 3/2013 |

(Continued)

*Primary Examiner* — Seema Mathew
(74) *Attorney, Agent, or Firm* — Oyen Wiggs Green & Mutala LLP (57) ABSTRACT

A heart valve repair apparatus is disclosed. The apparatus has a radially expandable ring having a first ring component connectable to a second ring component by a pair of securing members, a tube structure, and a net structure extending distally from the ring to the tube structure. The net structure comprises a plurality of cells, each of which defines a hollow space which may comprise a quadrilateral shape or a pentagon shape. The net structure also comprises a plurality of positioning cords connecting the plurality of cells to the tube structure. In some embodiments, one or more tabs are arranged to project outwardly from an inner circumferential surface of the ring, aligned and dimensioned to allow passage of a tether therethrough.

17 Claims, 10 Drawing Sheets

(56) References Cited

U.S. PATENT DOCUMENTS

| | | | |
|---|---|---|---|
| 10,265,172 B2* | 4/2019 | Krivoruchko | A61B 17/0401 |
| 10,327,743 B2* | 6/2019 | St. Goar | A61B 17/00234 |
| 10,327,901 B2* | 6/2019 | Righini | A61F 2/243 |
| 10,376,361 B2* | 8/2019 | Gross | A61F 2/2418 |
| 10,492,908 B2* | 12/2019 | Hammer | A61F 2/2436 |
| 10,531,956 B2* | 1/2020 | Skarsgard | A61F 2/2487 |
| 10,543,088 B2* | 1/2020 | Lashinski | A61F 2/2466 |
| 10,653,522 B1* | 5/2020 | Vidlund | A61F 2/2433 |
| 10,751,165 B2* | 8/2020 | Feinberg | A61F 2/12 |
| 10,765,517 B2* | 9/2020 | Speziali | A61F 2/2463 |
| 10,792,152 B2* | 10/2020 | Reich | A61F 2/2466 |
| 10,849,755 B2* | 12/2020 | Lashinski | A61F 2/2466 |
| 10,856,983 B2 | 12/2020 | Keränen et al. | |
| 10,993,804 B2* | 5/2021 | Braido | A61F 2/2418 |
| 11,109,972 B2 | 9/2021 | Marsot et al. | |
| 11,234,812 B2* | 2/2022 | Green | A61F 2/2418 |
| 11,259,924 B2* | 3/2022 | Gross | A61F 2/2466 |
| 11,291,547 B2* | 4/2022 | Gross | A61F 2/246 |
| 11,517,430 B1* | 12/2022 | Palmaz | A61F 2/90 |
| 11,517,435 B2* | 12/2022 | Chen | A61F 2/2466 |
| 11,529,232 B2* | 12/2022 | Albes | A61F 2/2466 |
| 11,633,281 B2* | 4/2023 | Kappetein | A61B 5/1121 623/2.36 |
| 11,707,611 B2* | 7/2023 | Cully | A61F 2/0077 604/288.04 |
| 11,766,330 B2* | 9/2023 | McCann | A61B 17/3468 623/2.36 |
| 11,839,543 B2* | 12/2023 | Rafiee | A61B 17/0401 |
| 11,844,690 B2* | 12/2023 | Jimenez | A61F 2/2418 |
| 11,850,147 B2* | 12/2023 | Oba | A61F 2/2433 |
| 11,883,291 B2* | 1/2024 | Gifford, III | A61F 2/2445 |
| 12,053,373 B2* | 8/2024 | McLean | A61F 2/0063 |
| 12,053,378 B2* | 8/2024 | Rafiee | A61B 17/0401 |
| 2005/0004665 A1 | 1/2005 | Aklog | |
| 2005/0075727 A1* | 4/2005 | Wheatley | A61F 2/2457 623/902 |
| 2009/0248148 A1* | 10/2009 | Shaolian | A61F 2/2441 632/2.37 |
| 2010/0030330 A1 | 2/2010 | Bobo et al. | |
| 2010/0049313 A1 | 2/2010 | Alon et al. | |
| 2011/0230961 A1 | 9/2011 | Langer et al. | |
| 2012/0053687 A1* | 3/2012 | Migliazza | A61F 2/2445 623/2.37 |
| 2012/0184971 A1 | 7/2012 | Zentgraf et al. | |
| 2013/0226289 A1* | 8/2013 | Shaolian | A61F 2/2448 623/2.37 |
| 2014/0031926 A1* | 1/2014 | Kudlik | A61F 2/2454 623/2.37 |
| 2014/0194716 A1 | 7/2014 | Diep et al. | |
| 2014/0309727 A1* | 10/2014 | Lamelas | A61F 2/2412 623/2.11 |
| 2014/0358223 A1* | 12/2014 | Rafiee | A61F 2/2418 623/2.13 |
| 2016/0030175 A1* | 2/2016 | Madjarov | A61F 2/2448 623/2.37 |
| 2016/0045312 A1* | 2/2016 | Braido | A61B 5/02028 623/2.37 |
| 2016/0113767 A1* | 4/2016 | Miller | A61F 2/2445 623/2.37 |
| 2016/0367360 A1 | 12/2016 | Cartledge et al. | |
| 2017/0065418 A1* | 3/2017 | Skarsgard | A61F 2/2487 |
| 2018/0055633 A1* | 3/2018 | Costello | A61F 2/2412 |
| 2018/0133011 A1* | 5/2018 | Perouse | A61F 2/2436 |
| 2018/0271655 A1* | 9/2018 | Hariton | A61F 2/2409 |
| 2018/0289484 A1* | 10/2018 | Kofidis | A61F 2/2457 |
| 2018/0325670 A1* | 11/2018 | de Canniere | A61F 2/2442 |
| 2019/0029826 A1* | 1/2019 | Zeitani | A61F 2/2445 |
| 2019/0053902 A1* | 2/2019 | Zentgraf | A61B 1/018 |
| 2019/0175341 A1* | 6/2019 | Cartledge | A61F 2/2436 |
| 2019/0336286 A1* | 11/2019 | Chen | A61F 2/2457 |
| 2020/0093599 A1 | 3/2020 | Benichou et al. | |
| 2020/0170799 A1* | 6/2020 | Yellin | A61F 2/2448 |
| 2021/0015609 A1 | 1/2021 | Dumontelle et al. | |
| 2021/0052387 A1* | 2/2021 | Greenan | A61F 2/2457 |
| 2021/0169649 A1* | 6/2021 | de Canniere | A61F 2/2442 |
| 2021/0220127 A1* | 7/2021 | Vidlund | A61F 2/2439 |
| 2021/0228349 A1* | 7/2021 | Vidlund | A61F 2/2457 |
| 2022/0047387 A1* | 2/2022 | Kofidis | A61F 2/2457 |
| 2022/0078760 A1* | 3/2022 | Su | H04W 72/02 |
| 2022/0079761 A1* | 3/2022 | Pearson | A61F 2/2463 |
| 2022/0079762 A1* | 3/2022 | Serina | A61F 2/2445 |
| 2022/0142778 A1* | 5/2022 | Skarsgard | A61B 17/0487 |
| 2022/0296858 A1* | 9/2022 | Skarsgard | A61F 2/2466 |
| 2023/0029712 A1* | 2/2023 | Skarsgard | A61F 2/2454 |
| 2023/0120494 A1* | 4/2023 | Mohl | A61F 2/2442 632/2.36 |
| 2023/0285133 A1* | 9/2023 | Eigler | A61F 2/2412 |
| 2023/0285143 A1* | 9/2023 | Lederman | A61F 2/2418 |
| 2023/0414357 A1* | 12/2023 | Costello | A61B 17/221 |
| 2024/0156591 A1* | 5/2024 | Pham | A61F 2/2418 |
| 2024/0245511 A1* | 7/2024 | Becerra | A61F 2/2412 |

FOREIGN PATENT DOCUMENTS

| | | |
|---|---|---|
| WO | 2015017689 A1 | 2/2015 |
| WO | 2015195823 A1 | 12/2015 |
| WO | 2020146548 A1 | 7/2020 |
| WO | 2020154797 A1 | 8/2020 |

* cited by examiner

HEART VALVE REPAIR APPARATUS

FIELD OF THE INVENTION

The invention pertains to an apparatus for repairing a heart valve, such as for repairing a mitral valve of the heart.

BACKGROUND OF THE INVENTION

The mitral valve is the most complex of the human heart's valves and is commonly associated with disease. Conditions affecting the normal functioning of the mitral valve include, for example, mitral valve regurgitation, mitral valve prolapse, and mitral valve stenosis. Mitral valve regurgitation refers to the condition whereby the leaflets of the mitral valve fail to coapt into apposition during ventricular contraction, resulting in abnormal leaking of blood from the left ventricle into the left atrium. Mitral valve prolapse refers to the condition where the mitral leaflets bulge abnormally up into the left atrium causing irregular behaviour of the mitral valve. Mitral valve stenosis refers to the narrowing of the heart's mitral valve obstructing blood flow. A number of factors may affect the normal functioning of the mitral leaflets.

Although intermediate grades of impaired functioning of the mitral valve may not require treatment, severely impaired mitral valve function may result in symptoms (for example, breathlessness, fatigue, exercise intolerance), and may represent a threat to life expectancy. Often, invasive surgery must be performed to repair or replace an abnormal mitral valve.

Traditionally, repairing or replacing a mitral valve involves an open heart procedure. Open heart procedures present patients with morbidity and mortality risks and require a post-op period of convalescence that is typically several months in duration. Open heart surgery may pose prohibitive risks, or may otherwise not be ideal for some patients, including some elderly patients and patients with other health issues. Repairing or replacing the mitral valve without invasive open heart procedures may be attractive therapy for such patients.

There is a need for an improved apparatus for repairing heart valves without involving open heart procedures.

SUMMARY

One aspect of the invention provides a heart valve repair apparatus. The apparatus is dimensioned to be implanted in the heart, such as in a mitral valve of the heart. The apparatus comprises a radially expandable ring. In some embodiments, the radially expandable ring has a first ring component connectable to a second ring component by a pair of securing members. The pair of securing members may be slideable along the ring to radially adjust the ring between a first dimension configuration and a second dimension configuration. The apparatus also comprises a tube structure, and a net structure extending distally from the ring to the tube structure. The net structure comprises a plurality of cells, each defining a hollow space, and a plurality of positioning cords connecting the plurality of cells to the tube structure. In some embodiments, the apparatus further comprises one or more tabs arranged to project outwardly from an inner circumferential surface of the ring. The one or more tabs may be arranged to project towards the interior of the ring. The tabs may be dimensioned to allow passage of a tether, such as a cinching tether, therethrough so as to adjust the ring at a desired dimension. The apparatus of the invention allows for a radially adjustable heart valve repair apparatus to accommodate the different geometries of the mitral valves of different subjects.

Further aspects of the invention and features of specific embodiments of the invention are described below.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

An embodiment of the invention is an apparatus 100 for repairing a heart valve, such as a mitral annulus of the heart. The apparatus 100 may for example be implanted in a mitral valve of the heart.

Figure 1:
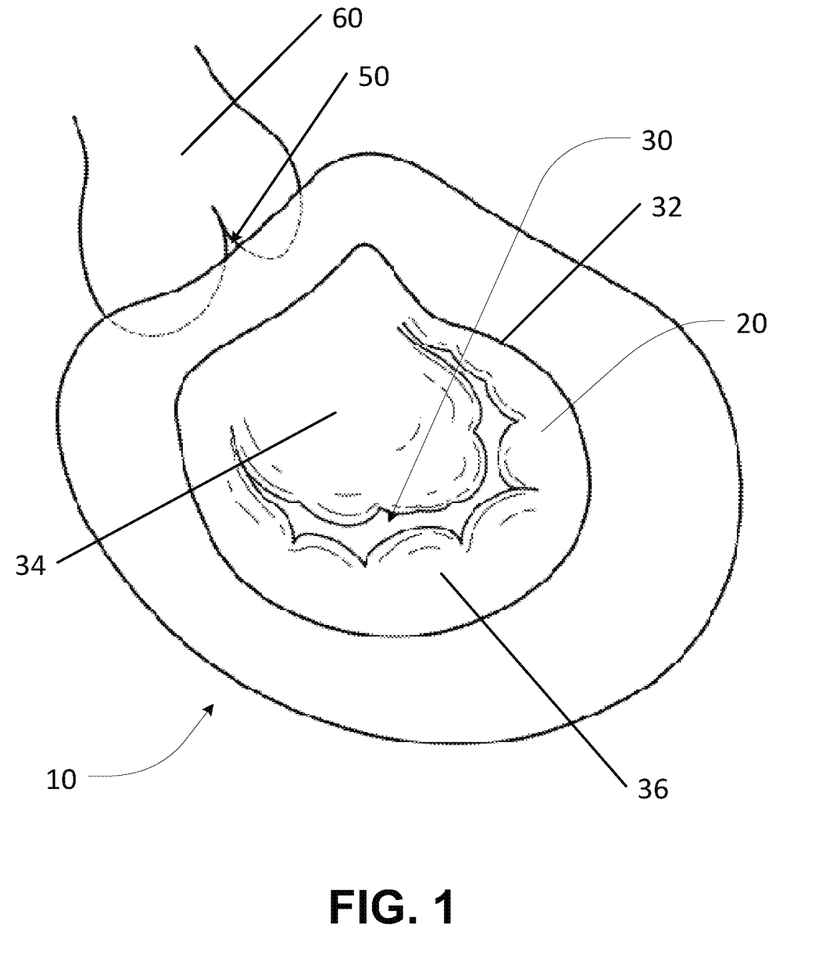
FIG. 1 is a top cross-sectional view of a heart showing normal coaptation of the mitral valve.
Figure 2:
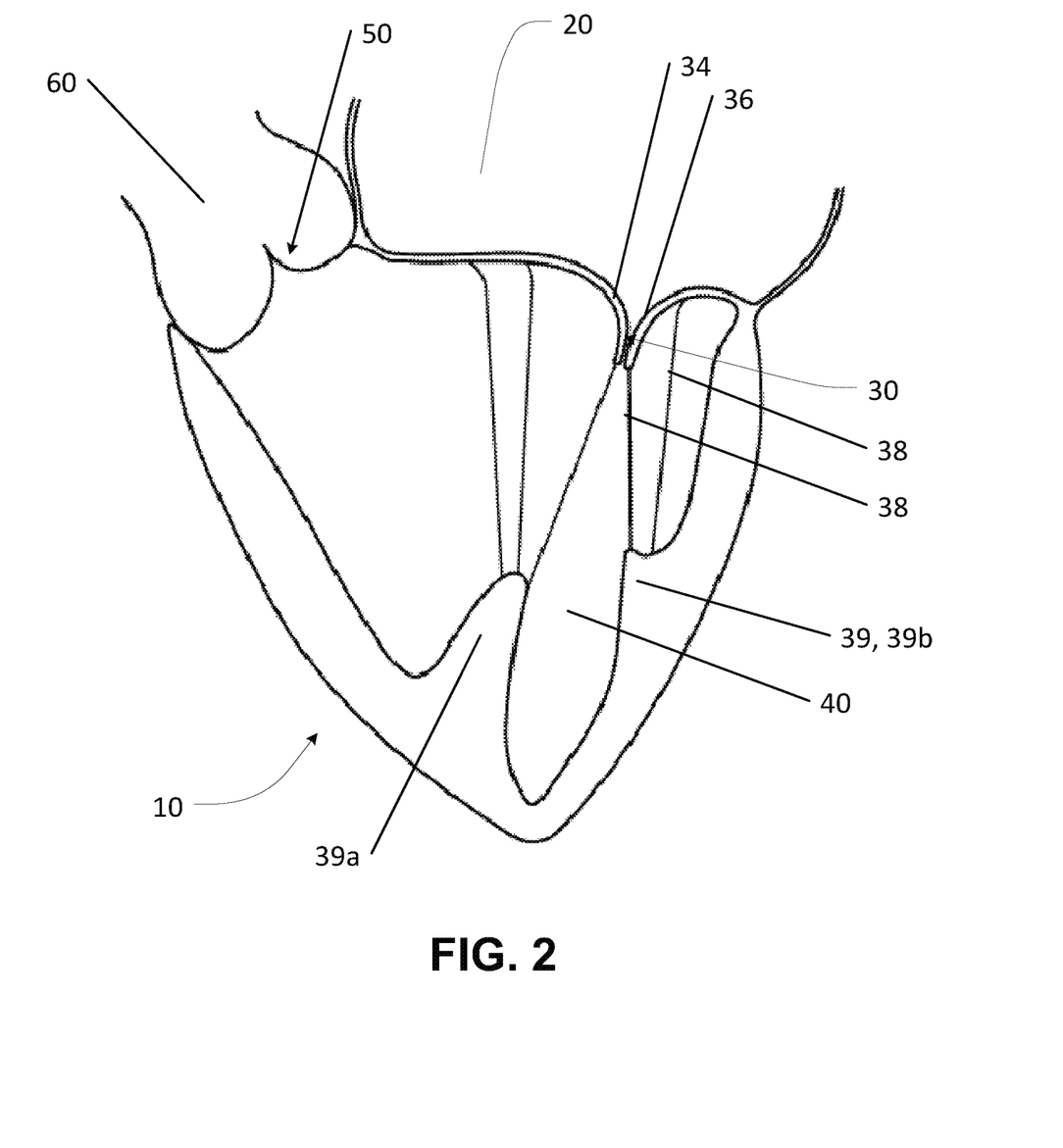
FIG. 2 is a side elevation cross-sectional view of the heart shown in FIG. 1.
Figure 3:
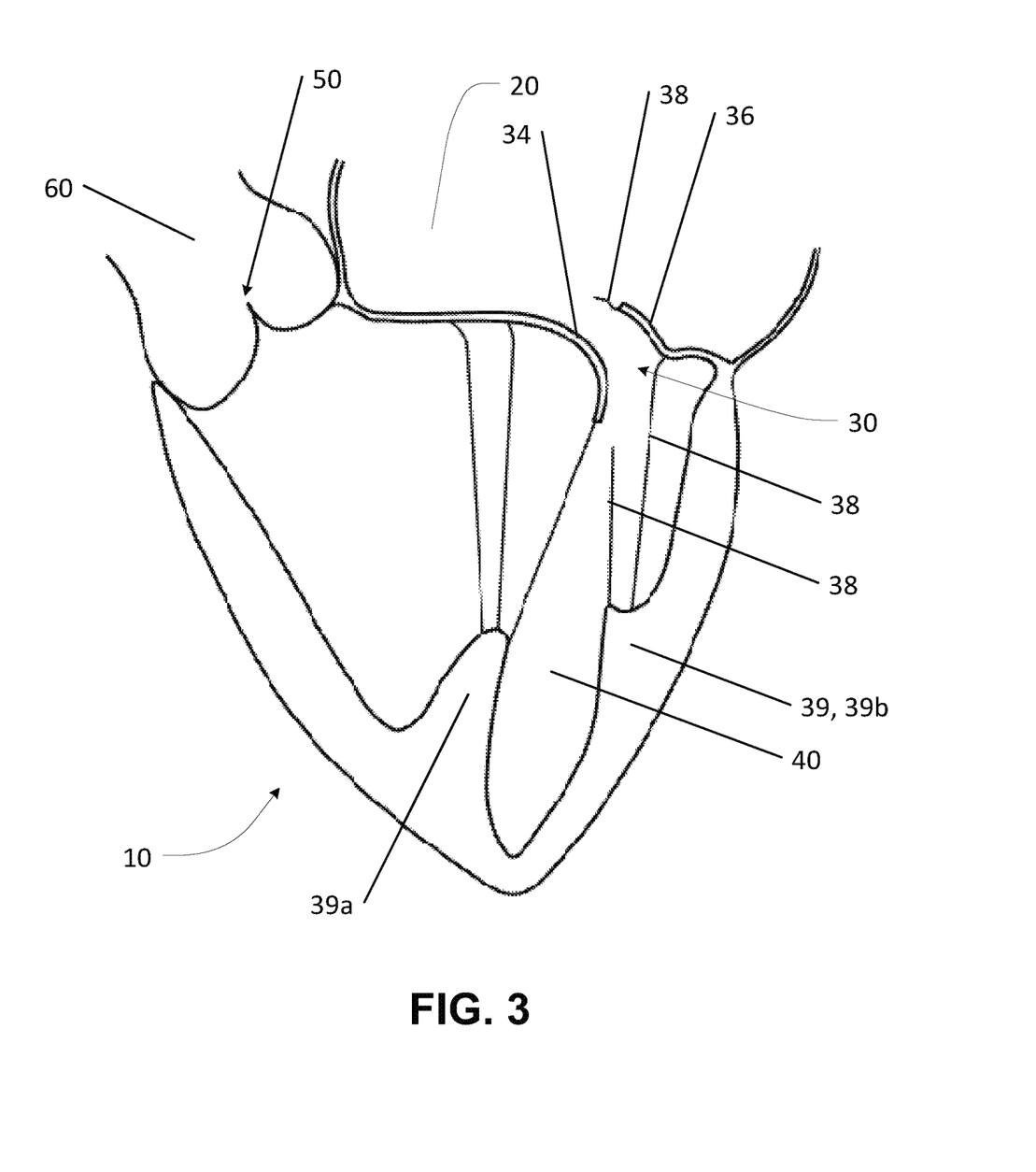
FIG. 3 is a side elevation cross-sectional view of a heart showing prolapse of a posterior mitral valve leaflet.

FIGS. 1 to 3 are schematic diagrams of a human heart 10. The human heart 10 is a muscle pump which relies on heart valves to achieve blood flow. In normal physiology, oxygenated blood returning from the lungs is collected in a left atrium 20, and then passes through a mitral (inlet) valve 30 to enter a left ventricle 40 (i.e. the pumping chamber). With contraction of the left ventricle 40, the elevation of left ventricular pressure causes the mitral valve 30 to close, preventing reversal of blood flow back into the atrium 20. As ventricular pressure exceeds aortic pressure, an aortic (outlet) valve 50 opens, and blood is pumped forward into an aorta 60. When left ventricle 40 relaxes, the ventricular pressure drops, the mitral valve 30 reopens to permit flow of blood from the left atrium 20 to the left ventricle 40, and the process repeats.

The mitral valve 30 separates the left atrium 20 from the left ventricle 40, and comprises a mitral annulus 32, leaflets (anterior 34 and posterior 36), chordae tendinae 38, and papillary muscles 39, 39a, 39b. During ventricular contraction (systole), the ventricular pressure rises, which forces displacement of mitral leaflets 34, 36 towards the atrium 20 (i.e., commonly known as atrial or leaflet displacement). The length and integrity of chordae tendinae 38 determines the degree of leaflet displacement. In normal physiology, equal displacement of anterior mitral leaflet 34 and posterior mitral leaflet 36 results in contact (coaptation) between the leaflets, and consequent competence of the mitral valve 30.

In circumstances where the mitral leaflet 34 and/or 36 is supported by chordae tendinae 38 which are elongated or ruptured, ventricular contraction may result in excessive atrial displacement of the leaflet(s), and this may prevent coaptation between the leaflets (FIG. 3). This is referred to as mitral leaflet prolapse. In this circumstance, the competency of the mitral valve 30 may be compromised and leakage may occur. Leakage through the mitral valve is referred to as mitral regurgitation, and when it is due to mitral leaflet prolapse it is referred to as degenerative mitral regurgitation. In other circumstances, the ventricular muscle itself can be diseased and its function impaired causing limited ventricular contraction and progressive ventricular dilation. Since the mitral leaflets 34, 36 are attached by chordae tendinae 38 to the ventricular muscle, ventricular dilation can limit leaflet movement toward the atrium 20 during contraction, resulting in poor leaflet coaptation and causing mitral regurgitation. This is referred to as functional mitral regurgitations.

In some embodiments, the apparatus 100 is implanted in an abnormal mitral valve 30. An abnormal mitral valve 30 is a mitral valve that is supported by elongated or ruptured chordae tendinae 38. The implantation of the apparatus 100 in the abnormal mitral valve 30 may facilitate to prevent excessive atrial displacement of the anterior mitral leaflet 34 and/or the posterior mitral leaflet 36, which may be caused by ventricular contraction, facilitating normal coaptation between the leaflets 34, 36.

Referring to FIGS. 4 to 7, the apparatus 100 comprises a ring 104 at a proximal end 108 of the apparatus 100, a tube structure 112 at a distal end 116 thereof, and a net structure 120 extending from the ring 104 to the tube structure 112. In some embodiments, the tube structure 112 comprises a posterior tube 124 extending to an anterior tube 128. The posterior tube 124 and the anterior tube 128 may comprise an arch shape, extending from a first end 132A,P to an opposing second end 136A,P. In some embodiments, the first end 132P of the posterior tube 124 extends to the second end 136P thereof, and therefrom continuously extends to the first end 132A of the anterior tube 128 and to the second end 136A thereof. The tube structure 112 may be integrally formed. The posterior and anterior tubes 124, 128 may be compressible. In some embodiments, the tubes 124, 128 are rounded hollow tubes that are constructed of braided threads. Threads can be made of one or more of polytetrafluoroethylene (PTFE), expanded PTFE, polyethylene, polypropylene, polyethylene terephthalate, an extracellular matrix biomaterial, and a tissue engineered material. The tubes 124, 128 may however be provided in other suitable forms that are known in the art.

The ring 104 may be radially adjustable between a first dimension configuration and a second dimension configuration. The first dimension configuration may be the fully compressed configuration, i.e., in which a diameter of the ring 104 is at a minimum diameter (see e.g., FIG. 5B). The second dimension configuration may be the fully expanded configuration, i.e., in which a diameter of the ring 104 is at a maximum diameter (see e.g., FIG. 5A). In some embodiments, the ring 104 comprises a first securing member 140 and a second securing member 144 arranged along the ring 104. The first securing member 140 may for example be arranged opposite to the second securing member 144. In some embodiments, the first and second securing members 140, 144 are slideable along the ring 104 to expand and compress the ring 104 to a desired diameter of the ring 104 between the first and second dimension configurations.

Figure 5A:
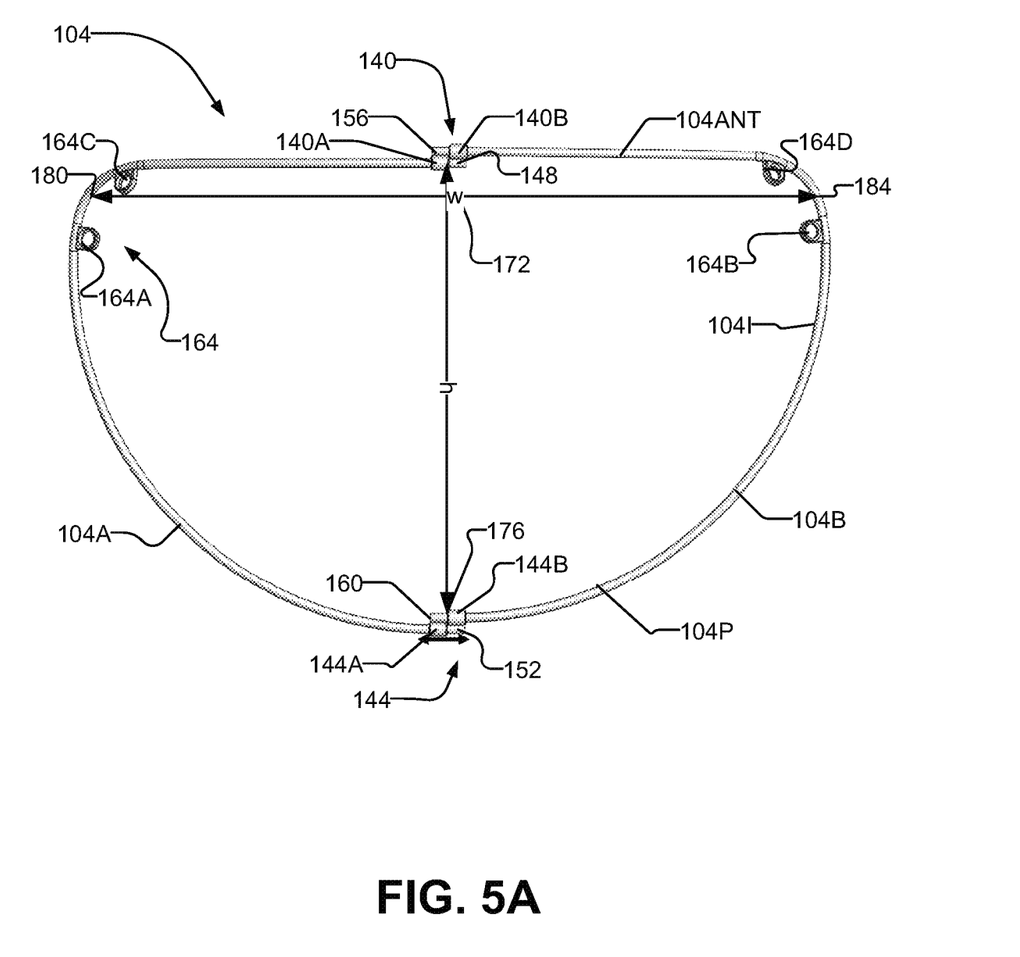
FIG. 5A is a top plan view of an example ring of the FIG. 3 apparatus in a fully expanded configuration.
Figure 5B:
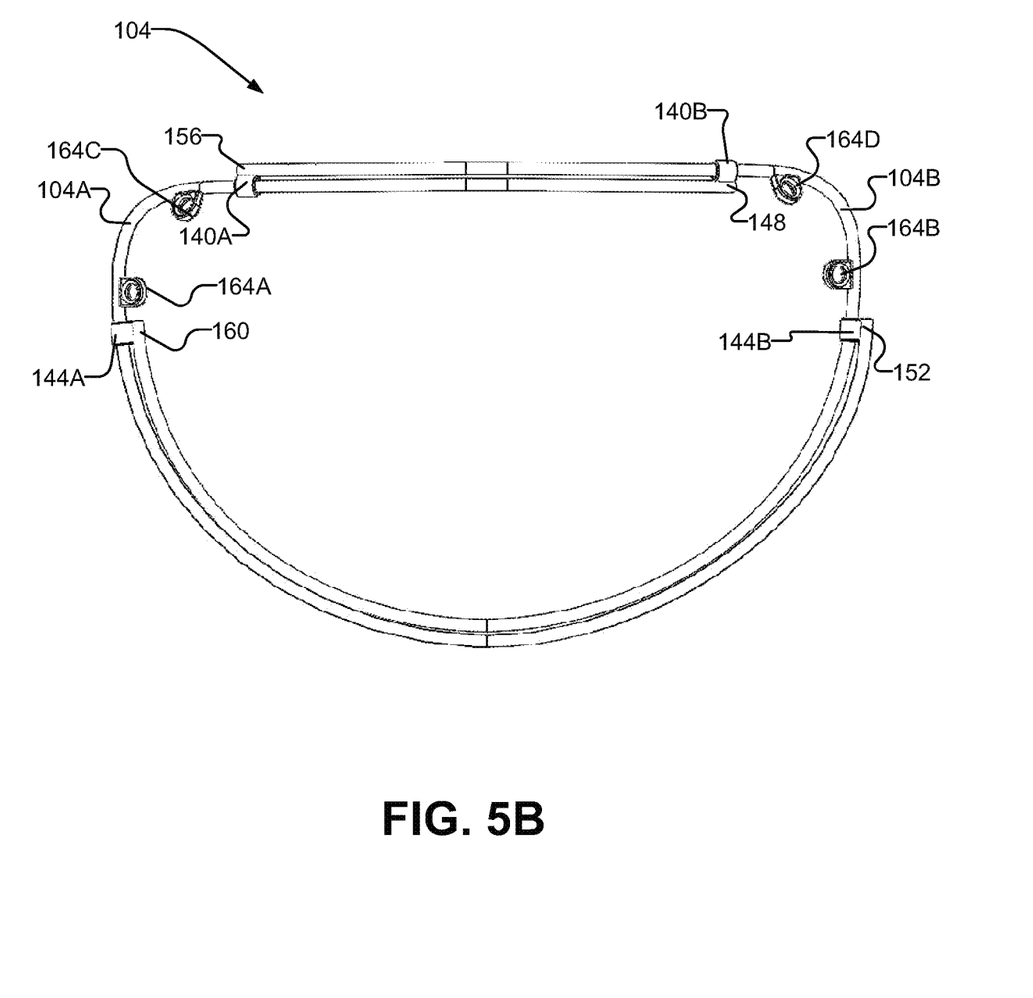
FIG. 5B is a top plan view of an example ring of the FIG. 3 apparatus in a compressed configuration.

In some embodiments, the ring 104 comprises a first ring component 104A and a second ring component 104B. The first and second ring components 104A,B may be connected by the first and second securing members 140, 144. In some example embodiments, the first ring component 104A comprises a first end 148 extending to an opposing second end 152, and the second ring component 104B comprises a first end 156 extending to an opposing second end 160.

In some example embodiments, the first and second securing members 140, 144 each comprises a pair of connectors, a first connector 140A and a second connector 140B of the first securing member 140, and a first connector 144A and a second connector 144B of the second securing member 144. The first connector 140A may be secured, e.g., by welding, proximate to or at the first end 148 of the first ring component 104A, and the second connector 140B may be secured, e.g., by welding, proximate to or at the first end 156 of the second ring component 104B. The first connector 144A may be secured, e.g., by welding, proximate to the second end 152 of the first ring component 104A, and the second connector 144B may be secured, e.g., by welding, proximate to the second end 160 of the second ring component 104B.

In some embodiments, the first connector 140A of the first securing member 140 is joined to the first end 156 of the second ring component 104B, and/or the second connector 140B of the first securing member 140 is joined to the first end 148 of the first ring component 104A.

In some embodiments, the first connector 144A of the second securing member 144 is joined to the second end 160 of the second ring component 104B, and/or the second connector 144B of the second securing member 144 is joined to the second end 152 of the first ring component 104A.

In some embodiments, the first connectors 140A, 140B and/or second connectors 144A, 144B each comprises a body 141A,B, 142A, B having a channel defined within the body 141A,B, 142A,B. In some embodiments, the body 141A, B, 142A,B comprises a tubular body.

In some embodiments, the first ring component 104A is slideable through the channel of the body 141A, 142A of one or both of the first connector 140A of the first securing member 140 and the first connector 144A of the second securing member 144 to move the ring 104 between the first and second dimension configurations.

In some embodiments, the second ring component 104B is slideable within the channel of the body 141B, 142B of one or both of the second connector 140B of the first securing member 140 and the second connector 144A of the second securing member 144 to move the ring 104 between the first and second dimension configurations.

The first connector 140A and the second connector 140B of the first securing member 140 may be connectable with one another. The first connector 144A and the second connector 144B of the second securing member 144 may be connectable with one another. The connectors 140A, 140B and/or connectors 144A, 144B may be connected with one another to secure the first and second ring components 104A,B at a desired dimension configuration.

The illustrated embodiments show that the ring 104 comprises two ring components 104A, 104B, connectable by two securing members 140, 144; however, this is not mandatory. The ring 104 may comprise any suitable number of ring components connectable to any number of securing members. In some embodiments, the ring 104 is integrally formed.

Figure 6:
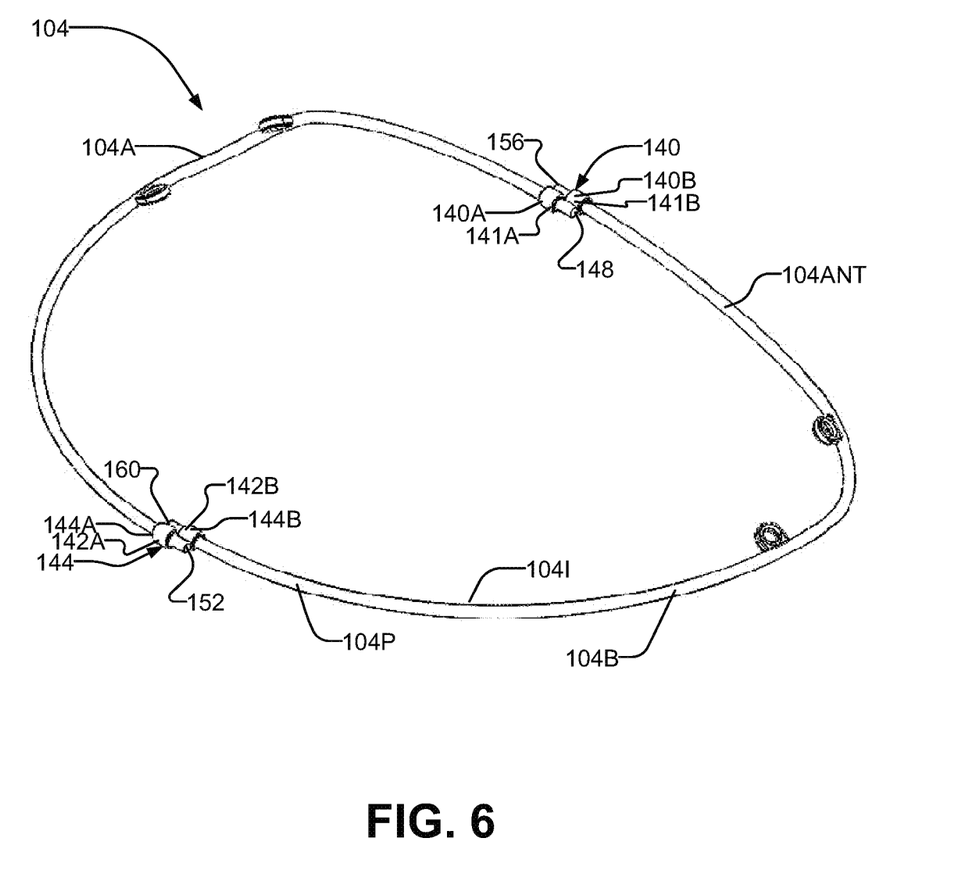
FIG. 6 is a perspective view of the FIG. 5A example ring.

One or more tabs 164 may be arranged to project from the ring 104, arranged for one or more tethers 168 to splice onto and/or pass therethrough. The one or more tabs 164 may be arranged to project outwardly from an inner circumferential surface 1041 of the ring 104. The inner circumferential surface 1041 of the ring 104 faces a central axis of the ring 104. The one or more tethers 168 may be a cinching tether. The one or more tethers 168 may for example be tensioned by a catheter to adjust the size of the ring 104 by sliding the first and/or second ring components 104A, B within the respective channels of the body 141A, 142A of the first connectors 140A, 144A and/or second connectors 140B, 144B. In some embodiments, the one or more tabs 164 comprise two tabs 164A, 164B oriented opposite to one another, arranged to project towards and facing one another. In such embodiments, a tether 168 is spliced onto the tab 164A, and then passes through, and exit, from the opposing tab 164B. The adjusted ring 104 may then be secured in position at the desired dimension. In some embodiments, the one or more tabs 164 are in the form of a closed loop. In some embodiments, additional tabs 164 may be arranged to project outwardly from the ring 104. For example, in the illustrated embodiments, two pairs of oppositely arranged tabs 164A, B, 164C, D, project inwardly from the ring 104. The tabs 164A,C may be oriented in a mirror image of tabs 164D,B.

In some example applications, the ring 104 is dimensioned to fit within the mitral annulus 32. The ring 104 is radially compressible and expandable so as to allow the ring 104 to be fitted into the mitral annulus 32 of different sizes, and thereby be used in different patients. The dimensions of the ring 104 can for example be radially adjusted at the time of implantation. In some example embodiments, the ring 104 is defined by a height (h), measured from a first point 172 to an opposing second point 176 on the ring 104, and a width (w), measured from a third point 180 to an opposing fourth point 184 on the ring 104. The first and second points 172, 176 define the greatest distance between two opposing points along the ring 104 in a first direction of the ring 104. The third and fourth points 180, 184 define the greatest distance between two opposing points along the ring 104 in the second direction, orthogonal to the first direction, of the ring 104.

In some embodiments, the height (h) of the ring 104 is less than the width (w) thereof. In some example embodiments, the height (h) of the ring 104 is in the range of from about 20 mm to about 40 mm, or in some embodiments, from about 25 mm to about 35 mm, or in some embodiments, from about 26 mm to about 32 mm. In some example embodiments, the width (w) of the ring 104 is in the range of from about 25 mm to about 60 mm, or in some embodiments, from about 30 mm to about 55 mm, or in some embodiments, from about 32 mm to about 52 mm.

Figure 7:
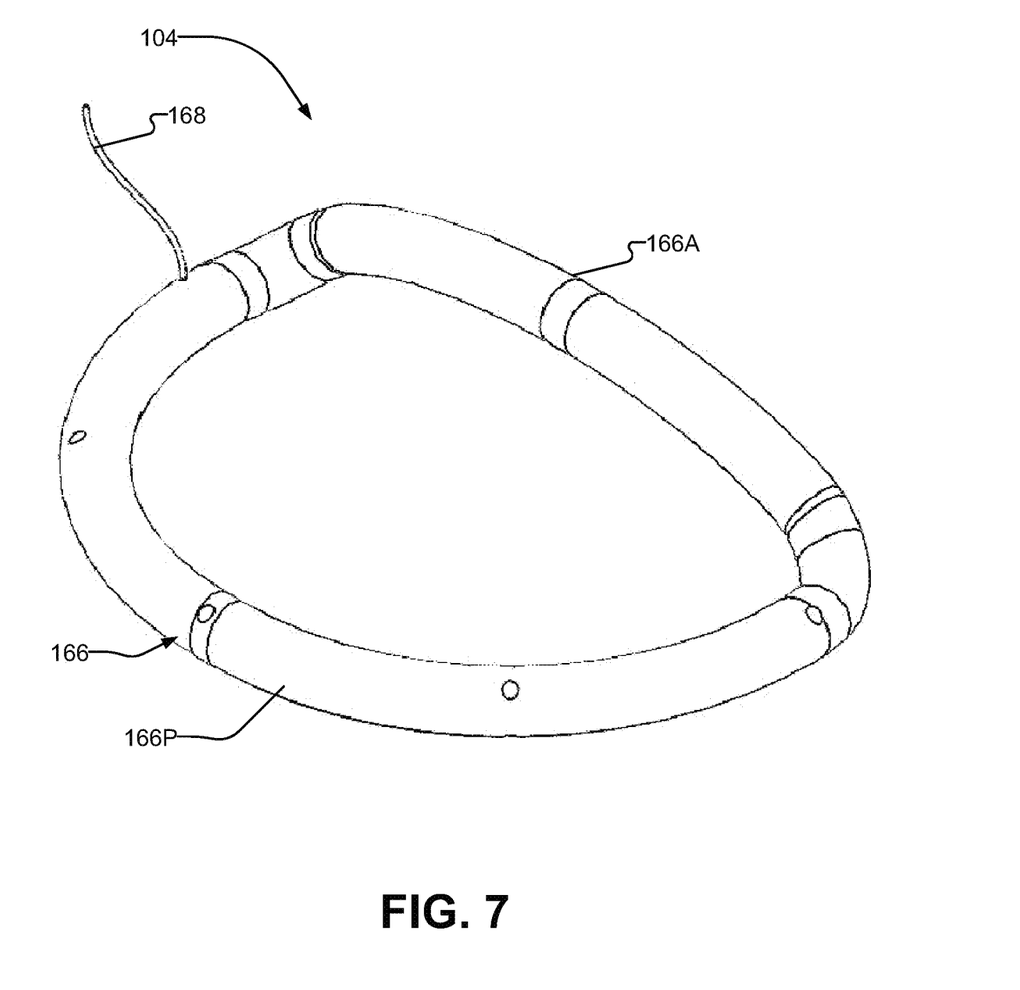
FIG. 7 is a perspective view of the FIG. 5A example ring with a sheath arranged to cover the ring.

The ring 104 comprises a biocompatible material, such as a biocompatible, memory metal alloy including (but not limited to) nickel and/or titanium and/or Nitinol™. Referring to FIG. 7, in some embodiments, a sleeve 166 is arranged to cover the ring 104. The sleeve 166 may be made of an expandable and/or compressible material such that the sleeve 166 may be stretched or expanded to conform to the size of the ring 104 as the ring 104 is being radially adjusted between the first and second dimension configurations. In some embodiments, the sleeve 166 is made of one or more of polytetrafluoroethylene (PTFE), expanded PTFE, polyethylene, polypropylene, polyethylene terephthalate, an extracellular matrix biomaterial, and a tissue engineered material. In some embodiments, the sleeve 166 is arranged to cover the one or more tethers 168. In some embodiments, the sleeve 166 is arranged to attach to the net structure 120. The net structure 120 may be arranged to suspend from the sleeve 166.

In some embodiments, an anterior part 166A of the sleeve 166 supports an anterior net component 188 of the net structure 120, and a posterior part 166P of the sleeve 166 supports a posterior net component 192 of the net structure 120.

In some embodiments, one or more of the tabs 164A,B, C,D secure the sleeve 166 to the ring 104. In such embodiments, an anterior part 166A of the sleeve 166 is fixedly secured to an anterior part 104ANT of the ring 104, and a posterior part 166P of the sleeve 166 is fixedly secured to a posterior part 104P of the ring 104.

In some embodiments, the one or more tabs 164A, B,C, D are positioned to allow the one or more tethers 168 to pass therethrough, enabling tightening of the one or more tethers 168 around the ring 104 at the desired dimension configuration. In some example use embodiments, the tether 168 is secured to one of the tabs 164A,B,C,D and therefrom, arranged to pass through the sleeve 166 within a lumen thereof along a distance around the ring 104, and to exit from the lumen of the sleeve 166 to a surface of the sleeve 166 at another one of the tabs 164A,B,C,D. For example, the tether 168 may be secured to tab 164B and therefrom, arranged to pass through the sleeve 166 within the lumen thereof along a distance around the ring 104, and to exit from the lumen of the sleeve 166 to a surface of the sleeve 166 at another tab 164A. By passing the tether 168 between the tabs 164A, 164B, the distance between the tabs 164A, 164B may be reduced, thereby resulting in tightening of the tether 168 around the ring 104. The tether 168 may pass through the tabs 164A, B,C,D but this is not mandatory. The tether 168 need not pass through the tabs 164A,B,C,D to tighten the tether 168 around the ring 104. The tether 168 may be tightened around the ring 104 by passing the tether 168 from one point of the ring 104 through the lumen of the sleeve 166 along a distance around the ring 104 and exiting out of the sleeve 166 at another point along the ring 104.

Figures 4, 4A:
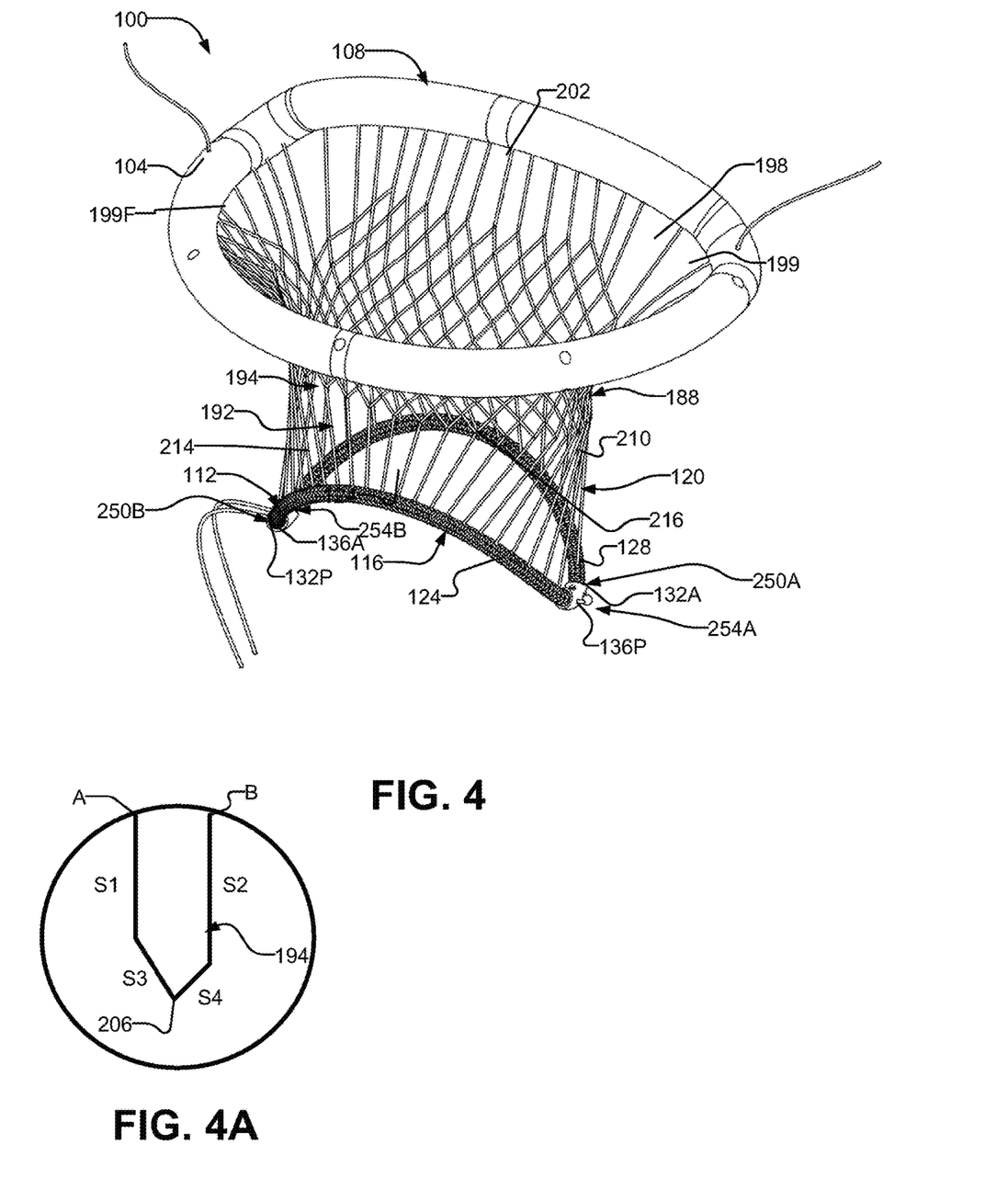
FIG. 4 is a prospective view of a heart valve repair apparatus according to an example embodiment of the invention.
FIG. 4A is a schematic diagram illustrating an example cell within the net structure of the FIG. 4 apparatus.
Figure 4B:
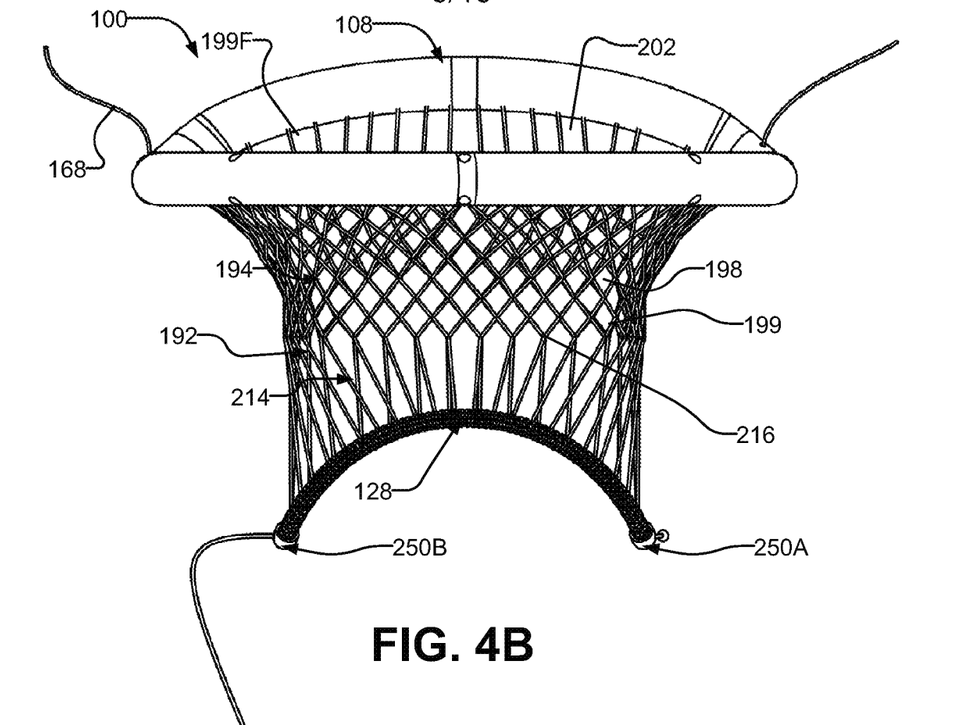
FIG. 4B is a front elevation view of the FIG. 4 apparatus.
Figure 4C:
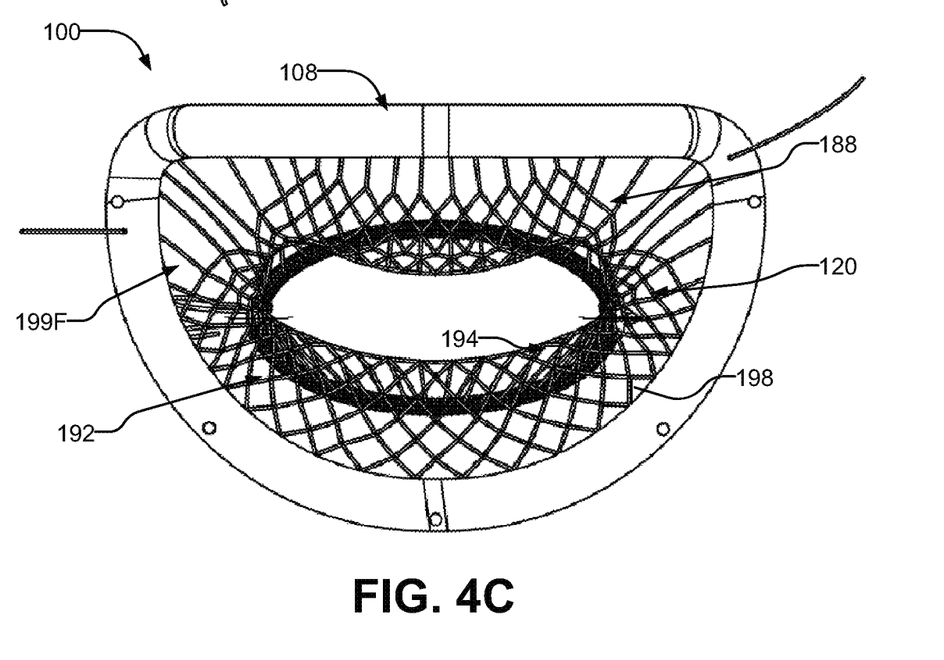
FIG. 4C is a top view of the FIG. 4 apparatus.

Referring to FIGS. 4 to 4C, in some embodiments, the net structure 120 comprises the anterior net component 188 and the posterior net component 192. In some embodiments, the net structure 120 is integrally formed by the anterior net component 188 and the posterior net component 192. The anterior and posterior net components 188, 192 comprise a plurality of cells 194, extending radially around the ring 104, and distally from the ring 104 extending towards the respective posterior tube 124 and anterior tube 128. Each of the cells 194 defines a hollow space 198 that may permit the passage of blood therethrough. The hollow spaces 198 defined by the plurality of cells 194 may comprise different shapes and/or sizes. The shapes and/or sizes of the cells 194 may be based on the position of the cell 194 relative to the ring 104 and/or the posterior tube 124 and/or anterior tube 128. The different shapes and/or sizes of the cells 194 advantageously prevents the cells 194 from overlapping with one another (or "bunching") during ventricular contraction, which is undesirable, and/or assists with optimizing the fit of the net structure 120 to accommodate the different geometries of the mitral valves 30 of different human subjects. In some embodiments, the shape of the cells 194 is a pentagon, a quadrilateral, or a combination thereof. In some embodiments, the pentagon comprises an irregular pentagon, i.e., a shape comprising five sides, and which not all of the sides are equal to each other. In some embodiments, the quadrilateral comprises a diamond and/or a rhombus.

In some example embodiments, the plurality of cells 194 of the anterior net component 188 and the posterior net component 192 are arranged in one or more rows 199, each of the rows 199 being aligned distally from the ring 104 towards the tube structure 112. The plurality of cells 194 of the anterior net component 188 and the posterior net component 192 may be arranged in a plurality of columns 202, each of the columns 202 being aligned circumferentially around the ring 104. In some embodiments, the number of rows 199 of cells 194 arranged at the anterior net component 188 and the posterior net component 192 is between about 2 and about 10, or in some embodiments, between about 2 and about 5, or in some embodiments, about 4. In some embodiments, the number of columns 202 of cells 194 arranged at the anterior net component 188 and the posterior net component 192 is between about 10 and about 50, or in some embodiments, between about 20 and about 40, or in some embodiments, between about 25 to about 35, or in some embodiments, about 32. The number of rows 198 and/or columns 202 arranged at the anterior net component 188 may be the same or different from that arranged at the posterior net component 192.

The row 199 of cells 194 that is in contact with the ring 104 is referred to herein as a first row 199F. In some embodiments, the first row 199F of cells 194 comprises cells having a pentagon shape. Referring to the schematic diagram in FIG. 4A, each of the pentagon-shaped cells 194 comprises a first side (S1) extending from a point (A) along the ring 104, an opposing second side (S2) extending from another point (B) along the ring 104, adjacent to point (A), and third and fourth sides (S3, S4) connecting the first and second sides (S1, S2). The third and fourth sides (S3, S4) join at a tip 206 of the pentagon. In some embodiments, at least some of the pentagon-shaped cells 194 arranged at the first row 199F have a length at the first and second sides (S1, S2) greater than a length at the third and fourth sides (S3, S4). In some embodiments, at least some of the pentagon-shaped cells 194 arranged at the first row 199F have a length at the first and second sides (S1, S2) that is at least 1 to 5 times greater than a length at the third and fourth sides (S3, S4). In some embodiments, at least some of the pentagon-shaped cells 194 arranged at the first row 199F have a length at the first and second sides (S1, S2) equal to or substantially equal to a length at the third and fourth sides (S3, S4). In some embodiment, the first row 199F of cells 194 comprises a combination of pentagon-shaped cells 194 and quadrilateral-shaped cells 194.

In some embodiments, the pentagon-shaped cells 194 at the first row 199F are arranged such that the cells 194 with the greatest ratio of the lengths of the first and second sides (S1, S2) to that of the lengths of the third and fourth sides (S3, S4) are positioned at opposite sides of the ring 104.

In some embodiments, the cells 194 at one or more rows 199 arranged distally from the first row 199F (i.e., second row, third row, to the nth row arranged distally from the ring 104) comprise a quadrilateral shape, and in some embodiments, a diamond shape. In some embodiments, the cells 194 at the one or more rows 199 arranged distally from the first row 199F have shapes and/or dimensions that are substantially the same as one another.

The cells 194 may be contractable between a relaxed position and an elongated position. The cells 194 may be elongated and/or contracted laterally and/or longitudinally with respect to apparatus 100.

In some embodiments, the net structure 120 comprises anterior and posterior positioning cords 210, 214 extending distally from the respective net component 188, 192 to the respective tube 124, 128. In some embodiments, each of the positioning cords 210, 214 extends from a tip 216 of a cell 194 to connect to the respective tube 124, 128. The positioning cords 210, 214 may be spaced along a length of the respective tube 124, 128. In some embodiment, the positioning cords 210, 214 are evenly spaced along the length of the tube 124, 128.

The anterior and posterior tube 124, 128 may be compressible. In some embodiments, the tubes 124, 128 are rounded hollow tubes that are constructed of braided threads. Threads can be made of one or more of polytetrafluoroethylene (PTFE), expanded PTFE, polyethylene, polypropylene, polyethylene terephthalate, an extracellular matrix biomaterial, and a tissue engineered material. The tube 124, 128 may however be provided in other suitable forms that are known in the art.

Figure 4D:
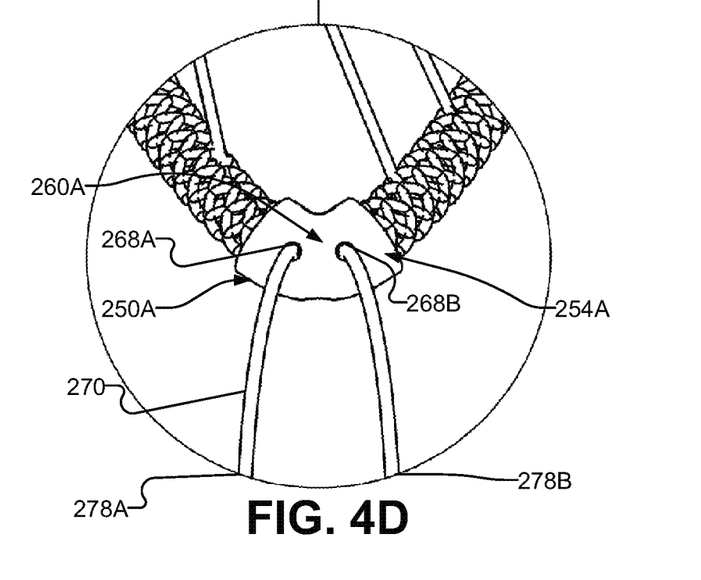
FIG. 4D is a front, close-up, view of a sleeve arranged on the anterior and posterior tubes of the FIG. 4 apparatus.
Figure 4E:
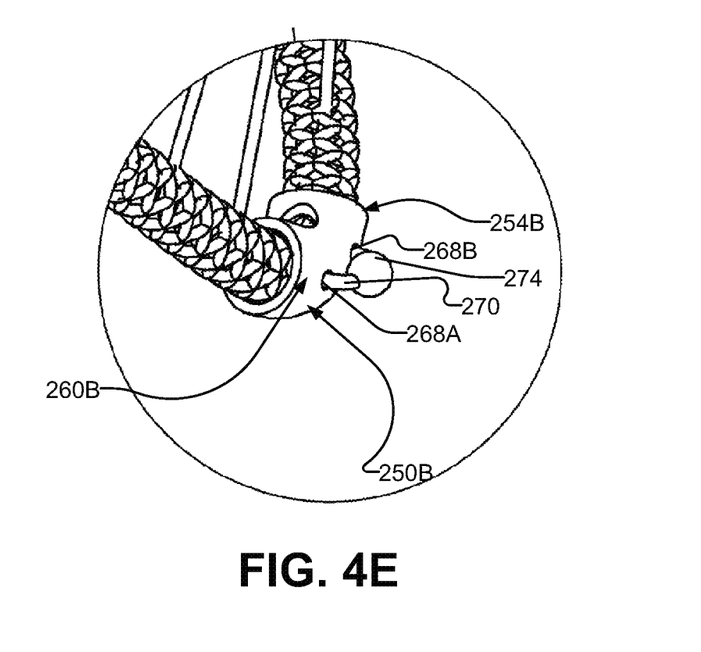
FIG. 4E is a perspective, close-up, view of another sleeve arranged on the anterior and posterior tubes of the FIG. 4 apparatus.

In some embodiments, a pair of sleeves 250A, B are arranged on the anterior tube 124 and/or posterior tube 128. The pair of sleeves 250A,B may be arranged spaced-apart from each other along the tube 124 and/or 128. In some embodiments, the pair of sleeves 250A, B are each arranged at a region 254A, B joining the anterior tube 124 to the posterior tube 128. In some embodiments, the regions 254A,B comprise a first region 254A and a second region 254B. The first region 254A may overlap or substantially overlap with the first end of the anterior tube 132A and the second end of the posterior tube 136P. The second region 254B may overlap or substantially overlap with the second end of the anterior tube 136A and the first end of the posterior tube 132P.

Referring to FIGS. 4D and 4E, in some embodiments, the sleeves 250A,B each comprise a body 260A, B having a channel defined within the respective body 260A,B. In some example embodiments, the body 260A, B is a tubular body. The tubes 124 and/or 128 are arranged within the channel. In some embodiments, at least a pair of holes 268A,B are defined on the body 260A,B. The holes 268A,B may be arranged spaced-apart from one another. The pair of holes 268A,B may be dimensioned for a tether 270 to pass therethrough. In some embodiments, the tether 270 is arranged to extend through the holes 268A,B defined on the body 260A,B of one of the sleeves 250A,B to form a closed loop 274. In some embodiments, opposing ends 278A,B of the tether 270 are arranged to extend outwardly through a respective one of the holes 268A, B defined on the body 260A, B of the other one of the sleeves 250A, B. Tensioning of the tether 270 may tighten the posterior tube 124 and/or anterior tube 128. Tightening of the posterior and anterior tubes 124, 128 may draw the tubes 124, 128 inwardly towards a central axis of the apparatus 100, reducing the perimeter defined by the tubes 124, 128.

In some example use embodiments, the first sleeve 250A is arranged at the first region 254A, and the second sleeve 250B is arranged at the second region 254B. The tether 270 is arranged to pass through a hole 268A defined on a first sleeve 254A and therefrom extends through a lumen defined within the anterior tube 124 and exits out of the hole 268A of the second sleeve 254B. The tether 270 enters the other hole 268B defined on the second sleeve 254B, and therefrom arranged to extend through a lumen defined within the posterior tube 128 and exits out of the other hole 268B defined on the first sleeve 254A. In this example embodiment, the ends 278A, B of the tether 270 extend outwardly out of the respective holes 268A, B defined on the first sleeve 254A, and the closed loop 274 is arranged on the second sleeve 268B. The tether 270 may be tightened by pulling the tether 270 at opposing ends 278A,B thereof. It is understood that the tether 270 may be arranged to extend through the lumen defined within the posterior tube 128 and then through the lumen defined within the anterior tube 124.

In some embodiments, the apparatus 100 is implanted in the mitral valve 30 of the heart 10. When implanted in the mitral valve 30, the anterior net component 188 is arranged to cover an atrial surface 35 of the anterior mitral leaflet 34, and the posterior net component 192 is arranged to cover an atrial surface 37 of the posterior mitral leaflet 36. The anterior net component 188 is oriented to substantially prevent atrial displacement of the anterior mitral leaflet 34, and the posterior net component 192 is oriented to substantially prevent atrial displacement of the posterior mitral leaflet 36.

The apparatus 100 may be implanted in the heart 10 according to the following example method. A conventional transatrialseptal introducer (or other device considered to be within the knowledge of persons skilled in the art of interventional cardiology) is inserted into a patient's circulatory system and advanced using a transcatheter approach. One or more papillary anchors and annular anchors are implanted respectively in the patient's mitral annulus and papillary muscle(s).

Once implanted in the heart, the papillary anchors and the annular anchor(s) are used to advance and guide the apparatus 100 through a patient's circulatory system to a desired implant site and to position the apparatus 100 in the heart. The apparatus 100 may for example be externally connected to the guidewires of the papillary and annular anchors.

With guidewires connected to the apparatus 100 externally, the apparatus 100 may then be inserted inside the introducer by radially compressing the apparatus 100. The apparatus 100 may be advanced endovascularly to an implant site to position apparatus 100 in the heart 10. Once positioned at the desired implant site, the apparatus 100 is radially expanded by releasing the apparatus 100 from the introducer. The apparatus 100 is adjusted to position anterior net component 188 and/or the posterior net component 192 to adjust the extent of atrial displacement of the mitral leaflets during ventricular contraction and correct leaflet prolapse and/or restore mitral valvular competence. Conventional Transesophageal Echocardiography (TEE) and/or fluoroscopy techniques may be used to guide the apparatus 100 along the guidewires through the patient's circulatory system to position the apparatus 100 in the desired implant site (e.g. the mitral valve).

The apparatus 100 is advanced along guidewire(s) to the mitral annulus 32 where the apparatus is positioned against the atrial muscle (not shown) adjacent the mitral annulus. The apparatus is secured to the mitral annulus. To secure the apparatus 100 to the mitral annulus 32, a lock is advanced in an open configuration along each guidewire to the corresponding anchor site of the apparatus 100 via a lock catheter. The lock may be secured in a locked configuration to tether adjacent each of the anchor sites. With the lock secured, the tether may be cut and the guidewire is withdrawn from the patient. The size of the ring 104 may be radially adjusted between the first dimension configuration and the second dimension configuration. The size of the ring 104 may be radially adjusted to set the annulus dimension to a desired size. The desired size may be determined by the performance of the valve. One or more tethers 168 may be arranged to pass through the lumen of the sleeve 166 covering the ring 104. For example, the one or more tethers 168 may be tensioned by a catheter to adjust the size of the ring 104 by sliding the first and/or second ring components 104A,B within the respective channels of the body 141A, 142A of the first connectors 140A, 140B and/or second connectors 144A, 144B. The one or more tethers 168 may be tightened around the ring 104 at the desired dimension configuration. Once the ring 104 is radially adjusted, the tether may be cut. The tether 270 may be arranged to pass through the lumens defined within the anterior and posterior tubes 124, 128. The tether 270 may be tensioned by a catheter to adjust a perimeter of the tubes 124, 128, thereby tightening the tubes 124, 128. Once the tubes 124, 128 are adjusted, the tether may be cut.

Throughout the foregoing description and the drawings, in which corresponding and like parts are identified by the same reference characters, specific details have been set forth in order to provide a more thorough understanding to persons skilled in the art. However, well known elements may not have been shown or described in detail or at all to avoid unnecessarily obscuring the disclosure.

As will be apparent to those skilled in the art in the light of the foregoing disclosure, many alterations and modifications are possible in the practice of this invention without departing from the scope thereof. Accordingly, the description and drawings are to be regarded in an illustrative, rather than a restrictive, sense.

The invention claimed is:

1. A heart valve repair apparatus (100) comprising:
a radially expandable ring (104) having a first ring component (104A) connectable to a second ring component (104B) by first and second securing members (140, 144), the first and second ring components being slideable through the first and second securing members, thereby radially adjusting the ring between a first dimension configuration and a second dimension configuration:
a tube structure (112); and
a net structure (120) extending distally from the ring to the tube structure, the net structure comprising a plurality of cells (194) each defining a hollow space (198), and a plurality of positioning cords (210, 214) connecting the plurality of cells to the tube structure,
wherein the first securing member (140) comprises a first connector (140A) connectable to a second connector (140B), the first connector being joined to a first end (156) of the second ring component, and the second connector being joined to a first end (148) of the first ring component.

2. The heart valve repair apparatus according to claim 1, wherein the first and second connectors of the first securing member each comprises a body (141A, 141B) having a channel defined within the respective body, and wherein the first ring component is slideable through the channel of the body of the first connector and the second ring component is slideable through the channel of the body of the second connector, thereby radially adjusting the ring between the first dimension configuration and the second dimension configuration.

3. The heart valve repair apparatus according to claim 1, further comprising a sheath (166) arranged to cover the ring.

4. The heart valve repair apparatus according to claim 1, further comprising one or more tabs (164) projecting outwardly from the ring.

5. The heart valve repair apparatus according to claim 4, wherein the one or more tabs are arranged to project outwardly from an inner circumferential surface of the ring.

6. The heart valve repair apparatus according to claim 4, wherein the one or more tabs comprise a first tab (164A) and a second tab (164B), the first and second tabs being oppositely positioned around the ring, and projecting to face one another.

7. The heart valve repair apparatus according to claim 6, wherein the one or more tabs further comprises a third tab (164C) and a fourth tab (164D), the first and third tabs being oriented in a mirror image of the second and fourth tabs.

8. The heart valve repair apparatus according to claim 4, wherein the one or more tabs are in the form of a closed loop, dimensioned to allow passage of a tether therethrough.

9. The apparatus according to claim 1, wherein the ring comprises a width (w) greater than a height (h).

10. A heart valve repair apparatus (100) comprising:
a radially expandable ring (104) having a first ring component (104A) connectable to a second ring component (104B) by first and second securing members (140, 144), the first and second ring components being slideable through the first and second securing members, thereby radially adjusting the ring between a first dimension configuration and a second dimension configuration;
a tube structure (112); and
a net structure (120) extending distally from the ring to the tube structure, the net structure comprising a plurality of cells (194) each defining a hollow space (198), and a plurality of positioning cords (210, 214) connecting the plurality of cells to the tube structure,
wherein the second securing member (144) comprises a first connector (144A) connectable to a second connector (144B), the first connector being joined to a second end (160) of the second ring component, and the second connector being joined to a second end (152) of the first ring component.

11. The heart valve repair apparatus according to claim 10, wherein the first and second connectors of the second securing member each comprises a body (142A, 142B) having a channel defined within the respective body, and wherein the first ring component is slideable through the channel of the body of the first connector and the second ring component is slideable through the channel of the body of the second connector, thereby radially adjusting the ring between the first dimension configuration and the second dimension configuration.

12. A heart valve repair apparatus (100) comprising:
a radially expandable ring (104) having a first ring component (104A) connectable to a second ring component (104B) by first and second securing members (140, 144), the first and second ring components being slideable through the first and second securing members, thereby radially adjusting the ring between a first dimension configuration and a second dimension configuration;
a tube structure (112); and
a net structure (120) extending distally from the ring to the tube structure, the net structure comprising a plurality of cells (194) each defining a hollow space (198), and a plurality of positioning cords (210, 214) connecting the plurality of cells to the tube structure,
wherein the plurality of cells of the net structure are arranged in one or more rows (199) aligned distally from the ring towards the tube structure, and in a plurality of columns (202) arranged circumferentially around the ring,
and wherein the one or more rows comprises a first row of the plurality of cells, the first row being in contact with the ring, and wherein at least some of the plurality of cells aligned in the first row comprises a pentagon shape, and
and wherein at least some of the pentagon shaped cells in the first row comprises a first side (S1) extending distally from a point (A) along the ring and an opposing second side (S2) extending distally from a second point (B) along the ring adjacent to the point (A), and a third and fourth sides (S3, S4) connecting the first and second sides, wherein the first and second sides each has a length greater than a length of each of the third and fourth sides.

13. The heart valve repair apparatus according to claim 12, wherein the plurality of cells that form the one or more rows arranged distally from the first row comprises a quadrilateral shape.

14. A heart valve repair apparatus (100) comprising:
a radially expandable ring (104) having a first ring component (104A) connectable to a second ring component (104B) by first and second securing members (140, 144), the first and second ring components being slideable through the first and second securing members, thereby radially adjusting the ring between a first dimension configuration and a second dimension configuration;
a tube structure (112);
a net structure (120) extending distally from the ring to the tube structure, the net structure comprising a plurality of cells (194) each defining a hollow space (198), and a plurality of positioning cords (210, 214) connecting the plurality of cells to the tube structure, and
a first sleeve (250A) and a second sleeve (250B), the first and second sleeves comprise a body (260A,B) having a channel defined within the body, wherein the tube structure is arranged within the channels of the bodies of the sleeves.

15. The apparatus according to claim 14, wherein the tube structure comprises a posterior tube (128) extending from a first end (132P) to an opposing second end (136P), and an anterior tube (124) extending from a first end (132A) to an opposing second end (136A), wherein the second end of the posterior tube is joined to the first end of the anterior tube, and the first end of the posterior tube is joined to the second end of the anterior tube.

16. The apparatus according to claim 15, wherein the first sleeve is arranged at a first region (254A) of the tube structure overlapping the first end of the anterior tube and the second end of the posterior tube, and the second sleeve is arranged at a second region (254B) of the tube structure overlapping the second end of the anterior tube and the first end of the posterior tube.

17. The apparatus according to claim 14, wherein a pair of holes (268A,B) are defined on each of the bodies of the first and second sleeves, wherein the holes are dimensioned for a tether to extend therethrough.

* * * * *